(12) United States Patent
Chiang et al.

(10) Patent No.: US 11,580,786 B2
(45) Date of Patent: Feb. 14, 2023

(54) UPDATING METHOD FOR CONFIGURATION PARAMETERS OF ELECTRONIC DEVICE, DEVICE AND COMPUTER-READABLE MEDIUM

(71) Applicant: Egis Technology Inc., Taipei (TW)

(72) Inventors: Yuan-Lin Chiang, Taipei (TW); Yu-Chun Cheng, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 17/458,894

(22) Filed: Aug. 27, 2021

(65) Prior Publication Data

US 2022/0198207 A1   Jun. 23, 2022

Related U.S. Application Data

(60) Provisional application No. 63/127,161, filed on Dec. 18, 2020.

(30) Foreign Application Priority Data

May 18, 2021   (CN) .......................... 202110542161.3

(51) Int. Cl.
*G06V 40/40* (2022.01)
*G06V 40/13* (2022.01)
*G06F 21/32* (2013.01)

(52) U.S. Cl.
CPC .............. *G06V 40/40* (2022.01); *G06F 21/32* (2013.01); *G06V 40/13* (2022.01)

(58) Field of Classification Search
CPC .... G06V 40/40; G06V 40/13; G06V 40/1388; G06V 40/1365; G06V 40/1347;
(Continued)

(56) References Cited

U.S. PATENT DOCUMENTS 9,922,235 B2   3/2018  Cho et al.
2016/0171280 A1*  6/2016  Han ................... G06V 40/1347
                                                         348/77
(Continued)

FOREIGN PATENT DOCUMENTS

CN    101079106 A    11/2007
CN    106127152 A    11/2016
(Continued)

*Primary Examiner* — Premal R Patel
(74) *Attorney, Agent, or Firm* — The PL Law Group, PLLC

(57) ABSTRACT

The present disclosure relates to an updating method for configuration parameters of an electronic device, a device and a computer-readable medium, wherein the updating method includes: acquiring fingerprint information collected by a fingerprint sensor at the electronic device; determining whether the fingerprint information is collected in a trusted mode; acquiring, in response to determining that the fingerprint information is collected in the trusted mode, a target configuration parameter of the electronic device for anti-spoofing detection according to the fingerprint information; and updating, in response to that the target configuration parameter of the electronic device and/or a current configuration parameter of the electronic device satisfies a preset condition, the current configuration parameter of the electronic device based on the target configuration parameter of the electronic device, wherein the current configuration parameter is used by the electronic device for anti-spoofing detection of a fingerprint in fingerprint information to be recognized. The solution of the present disclosure can update configuration parameters of the electronic device under certain conditions, thereby realizing high precision of anti-spoofing detection.

21 Claims, 4 Drawing Sheets

(58) Field of Classification Search
CPC ...... G06V 40/45; G06F 21/32; G06K 9/6256; G06N 20/00
See application file for complete search history.

(56) References Cited

U.S. PATENT DOCUMENTS

| | | |
|---|---|---|
| 2016/0303880 A1 | 10/2016 | Chattopadhyay et al. |
| 2017/0316250 A1* | 11/2017 | Roh .................. G06V 40/1365 |
| 2019/0163954 A1 | 5/2019 | Kim et al. |
| 2020/0012844 A1* | 1/2020 | Kim .................. G06V 40/1365 |
| 2021/0166047 A1* | 6/2021 | Juncker ............. G06V 40/1365 |

FOREIGN PATENT DOCUMENTS

| | | |
|---|---|---|
| CN | 107251051 A | 10/2017 |
| CN | 107690654 A | 2/2018 |
| CN | 111191642 A | 5/2020 |
| CN | 111582145 A | 8/2020 |

* cited by examiner

UPDATING METHOD FOR CONFIGURATION PARAMETERS OF ELECTRONIC DEVICE, DEVICE AND COMPUTER-READABLE MEDIUM

CROSS-REFERENCE TO RELATED APPLICATION(S)

This application claims the benefit under 35 USC § 119(a) of U.S. Patent Application No. 63/127,161 filed on Dec. 18, 2020, Chinese Patent Application No. 202110542161.3, filed on May 18, 2021, in the Chinese Intellectual Property Office, the entire disclosure of which is incorporated herein by reference for all purposes.

TECHNICAL FIELD

The present disclosure generally relates to the field of fingerprint recognition. More particularly, the present disclosure relates to an updating method for configuration parameters of an electronic device, an electronic device and a non-transitory computer-readable storage medium.

BACKGROUND

With the widespread use of various electronic devices (including smart terminals) in daily life, safe access by the user has become an important factor to be concerned. To ensure security during operation of the devices, various schemes for authenticating the user have been proposed, wherein fingerprint features have become an effective means for security authentication due to their uniqueness.

In the development stage of the electronic device, some devices are usually selected to collect a great deal of real hand and fake hand fingerprint information, from which detection parameters for anti-spoofing detection are formed. Due to the fact that the number of electronic devices used for acquiring detection parameters and the amount of collected fingerprint information are insufficient, and problems such as an unexpected tolerance of some hardware elements and hardware differences of individual electronic devices, the detection parameter may be not applicable to all electronic devices, and therefore, when the anti-spoofing detection is carried out on a specific electronic device, the recognition accuracy may be not high enough.

SUMMARY

At least in view of the above deficiencies mentioned in the background art, an embodiment of the present disclosure provides a solution of updating anti-spoofing detection configuration parameters of an electronic device under a certain condition, so as to implement high-precision anti-spoofing detection. Specifically, in the embodiments of the present disclosure, the accuracy of the configuration parameters may be guaranteed by defining the fingerprint information collection mode and the update condition, thereby realizing high precision of anti-spoofing detection. To this end, the present disclosure provides solutions in several aspects as described below.

In a first aspect, the present disclosure provides an updating method for configuration parameters of an electronic device, including: acquiring fingerprint information collected by a fingerprint sensor at the electronic device; determining whether the fingerprint information is collected in a trusted mode; acquiring, in response to determining that the fingerprint information is collected in the trusted mode, a target configuration parameter of the electronic device for anti-spoofing detection according to the fingerprint information; and updating, in response to that the target configuration parameter of the electronic device and/or a current configuration parameter of the electronic device satisfies a preset condition, the current configuration parameter of the electronic device based on the target configuration parameter of the electronic device, wherein the current configuration parameter is used by the electronic device for anti-spoofing detection of a fingerprint in fingerprint information to be recognized.

In an embodiment, determining whether the fingerprint information is collected in the trusted mode includes: determining that the fingerprint information is collected in the trusted mode in response to detection of any one of: the electronic device is in a preset mode of operation; the electronic device is within a preset time period after executing a preset operation; or the electronic device executes fingerprint recognition based on the fingerprint information, and the recognition result is a preset result.

In an embodiment, the preset mode of operation includes a registration mode; the preset operation includes a successful non-fingerprint unlock operation or an initial start-up operation; and/or the preset result includes that a preset number of continuous fingerprint recognition scores exceed a preset threshold.

In an embodiment, acquiring the target configuration parameter of the electronic device includes: calculating a detect score based on each fingerprint information sample in the fingerprint information; generating or updating anti-spoofing detection distribution of the electronic device according to a plurality of detect scores; and determining the target configuration parameter based on the anti-spoofing detection distribution.

In an embodiment, calculating the detect score includes: calculating based on the fingerprint information sample using an anti-spoofing detector learning model to obtain the detect score of each fingerprint information sample.

In an embodiment, generating or updating anti-spoofing detection distribution of the electronic device includes: counting a proportion of the number of fingerprint information samples of each detect score in the total number of fingerprint information samples; and generating or updating the anti-spoofing detection distribution based on the detect score and the corresponding proportion.

In an embodiment, the target configuration parameter includes any one or more of: a median, a standard deviation and an average of the anti-spoofing detection distribution, a detect score threshold exceeding a preset proportion or a detect score reaching a preset proportion.

In an embodiment, the preset condition includes any one or more of: the number of fingerprint information samples on which the target configuration parameter is based exceed a preset number; or a difference between the target configuration parameter and the current configuration parameter exceeds a preset range.

In an embodiment, updating the current configuration parameter of the electronic device based on the target configuration parameter of the electronic device includes: modifying the current configuration parameter based on the target configuration parameter according to a preset rule.

In an embodiment, the updating method further includes: performing, in response to determining that the fingerprint information is not collected in a trusted mode, anti-spoofing detection of the fingerprint information based on the current configuration parameter of the electronic device.

In an embodiment, determining whether the fingerprint information is collected in the trusted mode includes: determining that the fingerprint information is not collected in the trusted mode in response to detection of any one of: unlock operations number of the electronic device in a preset time period exceeds a preset number; or a difference between a fingerprint recognition score in a latest time period and a historical score of the electronic device exceeds a preset range.

In a second aspect, the present disclosure provides an electronic device, including a processor; and a memory storing program instructions executable by the processor, wherein the program instructions, when executed by the processor, cause the electronic device to perform the operations of: acquiring fingerprint information collected by a fingerprint sensor at the electronic device; determining whether the fingerprint information is collected in a trusted mode; acquiring, in response to determining that the fingerprint information is collected in the trusted mode, a target configuration parameter of the electronic device for anti-spoofing detection according to the fingerprint information; and updating, in response to that the target configuration parameter of the electronic device and/or a current configuration parameter of the electronic device satisfies a preset condition, the current configuration parameter of the electronic device based on the target configuration parameter of the electronic device, wherein the current configuration parameter is used by the electronic device for anti-spoofing detection of a fingerprint in fingerprint information to be recognized.

In a third aspect, the present disclosure provides a non-transitory computer-readable storage medium storing program instructions for updating configuration parameters of an electronic device, wherein the program instructions, when executed by at least one processor, causing the following operations to be implemented: acquiring fingerprint information collected by a fingerprint sensor at the electronic device; determining whether the fingerprint information is collected in a trusted mode; acquiring, in response to determining that the fingerprint information is collected in the trusted mode, a target configuration parameter of the electronic device for anti-spoofing detection according to the fingerprint information; and updating, in response to that the target configuration parameter of the electronic device and/or a current configuration parameter of the electronic device satisfies a preset condition, the current configuration parameter of the electronic device based on the target configuration parameter of the electronic device, wherein the current configuration parameter is used by the electronic device for anti-spoofing detection of a fingerprint in fingerprint information to be recognized.

Based on the above description about the solutions of the present disclosure, those skilled in the art will appreciate that the solutions of the above embodiments can ensure accuracy of the generated target configuration parameter by defining the fingerprint information collection mode (trusted mode). Furthermore, by defining the update condition, the accuracy of the anti-spoofing detection can be greatly improved each time the configuration parameter is updated, and thus the high precision of fingerprint anti-spoofing detection may be achieved.

BRIEF DESCRIPTION OF THE DRAWINGS

The above and other objects, features and advantages of exemplary implementations of the present disclosure will become readily understandable by reading the following detailed description with reference to the accompanying drawings. In the accompanying drawings, several implementations of the present disclosure are illustrated by way of example but not limitation, and like or corresponding reference numerals indicate like or corresponding parts, in which.

DETAILED DESCRIPTION

The technical solutions in the embodiments of the present disclosure will be described clearly and completely below with reference to the accompanying drawings in the embodiments of the present disclosure. Obviously, the described embodiments are only a part, not all, of the embodiments of the disclosure. All other embodiments obtained by those skilled in the art based on the embodiments of the present disclosure without paying any creative effort shall be included in the protection scope of the present disclosure.

As mentioned in the background art, in the development stage of anti-spoofing detection of the electronic device, the setting of anti-spoofing detection configuration parameters almost completely depends on the collection of prior information, such as one or more sample devices used in the development stage, the number of fake fingers made and/or used in the development stage, real hand fingerprint samples and fake hand fingerprint samples collected in the development stage, and so on. However, due to the limited amount of the collected or used information, and unexpected element tolerances and differences between individual devices, etc., applying the same configuration parameter in the development stage to all individual devices may lead to that the anti-spoofing detection configuration parameters in the electronic device actually used by a user cannot meet the design expectations. In addition, even if the individual electronic device of the user is matched with the designed anti-spoofing detection configuration parameters in an early stage, wear or aging of the hardware with use of the electronic device may make the early anti-spoofing detection configuration parameters no longer suitable for the current electronic device, leading to reduced accuracy in the fingerprint anti-spoofing detection.

In view of this, an embodiment of the present disclosure provides an updating method for anti-spoofing detection configuration parameters of an electronic device. According to the updating method, the configuration parameters of the electronic device are updated or corrected by collecting credible samples of the electronic device during operation of the electronic device by a user, so that for each individual electronic device, the anti-spoofing detection parameters suitable for the specific electronic device can be configured, and thus the accuracy of fingerprint anti-spoofing detection is improved.

Figure 1:
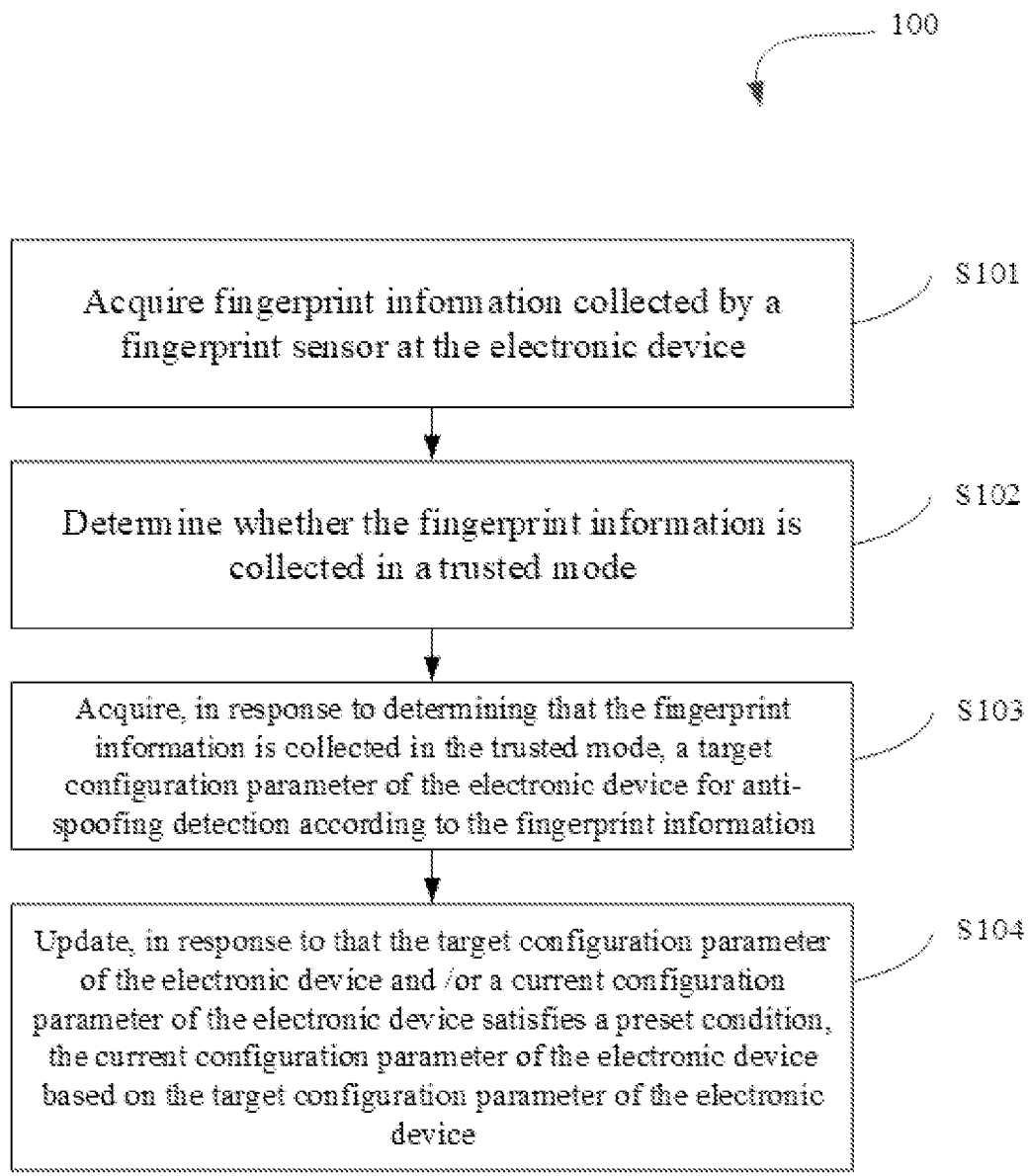
FIG. 1 is a schematic flowchart of an updating method for configuration parameters of an electronic device according to an embodiment of the present disclosure.

FIG. 1 is a schematic flowchart of an updating method 100 for configuration parameters of an electronic device according to an embodiment of the present disclosure.

As shown in FIG. 1, the method 100 may include a step S101 of acquiring fingerprint information collected by a fingerprint sensor at the electronic device. The electronic device may be any device having the fingerprint recognition technology applied therein. In an embodiment, the electronic device may be a smart terminal which may be, for example, a smart phone, a tablet, a laptop, a palmtop, a wearable device, or the like. In a specific implementation scenario, a fingerprint sensor of the electronic device may be used to collect fingerprint information of one or more fingers (for example, three fingers), and the number of fingerprint information samples included in the fingerprint information, for example, may be 20 or 30, may be specifically set according to needs.

Depending on different modes of storage, the fingerprint information may be in different forms. For example, the fingerprint information may be in the form of a picture or an array of information.

After the fingerprint information is collected, the flow proceeds to step S102, determining whether the fingerprint information is collected in a trusted mode. It will be appreciated that the electronic device may be used in a variety of situations to collect fingerprint information, either from a real finger or a fake finger. When the collected fingerprint information is expected to be used for correcting the anti-spoofing detection configuration parameters of the electronic device, anti-spoofing detection of the collected fingerprint information should be definite, so as to avoid the situation where false information is used for inducing correction and causes breach of the security defense. In an embodiment of the present disclosure, by introducing the determination mechanism of the "trusted mode", effective fingerprint information are increased, and reliability of the fingerprint information used for generating configuration parameters is ensured, thereby ensuring the accuracy of anti-spoofing detection, and reducing the possibility of malicious misleading. Here, the "trusted mode" refers to a mode in which it can be presumed that the current operation or use behavior is performed by the user of the electronic device with a real finger. Thereby, in the trusted mode, the collected fingerprint information may be used as valid fingerprint information for subsequent update processing. The trusted mode may take different forms of presentation based on various usage scenarios of the electronic device.

In an embodiment, when the electronic device is in a preset mode of operation, it may be determined that fingerprint information collection in this period is collected in a trusted mode. The preset mode of operation may include, for example, a registration mode. In the registration mode, a user registers his/her fingerprint information for later unlocking and other operations. Therefore, it is generally determined that the electronic device in the registration mode is operated with a real finger, i.e., the fingerprint information collected at this time corresponds to a real finger.

In another embodiment, when the electronic device is within a preset time period after executing the preset operation, it may be determined that fingerprint information collection in this period is collected in a trusted mode. In an implementation, the preset operation may include, for example, a successful non-fingerprint unlock operation. The non-fingerprint mode may include, for example, face unlock, password unlock, graph unlock or other unlock modes. In another implementation, the preset operation may include, for example, an initial start-up operation, such as the initial start-up of a new electronic device. These modes of operation generally indicate that the electronic device is being used by the user, and is most likely operated with a real finger. Therefore, if fingerprint information is collected within a preset time period after these operations, it is highly likely that the fingerprint information corresponds to a real finger. The preset time period may be, for example, several minutes, several tens of minutes, or the like. The preset time period may be different based on different preset operations. For example, the preset time period after the successful non-fingerprint unlock may be 30 minutes; while the preset time period after the initial start-up may be 2 hours.

In a further embodiment, when the electronic device executes fingerprint recognition based on the collected fingerprint information, and the recognition result is a preset result, it may be determined that the collected fingerprint information is from a real finger. The preset result may include, for example, that a preset number (e.g., 3) of continuous fingerprint recognition scores exceed a preset threshold. In a specific implementation scenario, the fingerprint recognition score may be an anti-spoofing detect score calculated by, for example, an anti-spoofing detector learning model for a fingerprint information sample in the fingerprint information; or a detect score obtained through similarity comparison between a fingerprint information sample and a reference fingerprint information. The preset threshold may be a detect score threshold substantially confirming, when the detect score of the fingerprint information sample exceeds the threshold, that the fingerprint information sample comes from a real finger. In an example, the preset threshold may be set to 4000.

As can be seen from the above-listed trusted modes of the electronic device, the fingerprint information collected under these conditions has high confidence (e.g., fingerprints of a real finger of the user), from which accurate configuration parameters can be obtained. It will be appreciated that the trusted mode of the electronic device is not limited to the above listed situations, and any other situation that can ensure secure operation of the electronic device may be used as the trusted mode, which are not elaborated here.

After it is confirmed that the electronic device has collected credible fingerprint information, the flow proceeds to S103, where the method 100 includes acquiring a target configuration parameter of the electronic device for anti-spoofing detection from the collected credible fingerprint information. As previously mentioned, the anti-spoofing detection configuration parameter suitable for each individual electronic device may vary. Here, the term "target configuration parameter" refers to a configuration parameter expected to be used for anti-spoofing detection, which is suitable for a current state of a specific individual electronic device. Since the above collected credible fingerprint information is collected during operation of the specific electronic device, the anti-spoofing detection configuration parameter obtained from the fingerprint information can accurately reflect the characteristics of the specific electronic device, and can be used as the target configuration parameter of that specific electronic device. Details of the configuration parameters related to anti-spoofing detection will be described later with reference to the accompanying drawings.

After acquiring the target configuration parameter of the electronic device, the method 100 may proceed to step S104, updating, in response to that the target configuration parameter of the electronic device and/or a current configuration parameter of the electronic device satisfies a preset condition, the current configuration parameter of the electronic device based on the target configuration parameter of the electronic device. The updated current configuration parameter may be used by the electronic device for subsequent anti-spoofing detection of fingerprints in fingerprint information to be recognized.

In some embodiments, the preset condition may include any one or more of: the number of fingerprint information samples on which the target configuration parameter is based exceed a preset number; or a difference between the target configuration parameter and the current configuration parameter exceeds a preset range. It will be appreciated that the larger the number of fingerprint information samples on which the target configuration parameter is generated is, the more accurate the obtained target configuration parameter will be (see the description below in conjunction with the anti-spoofing detection distribution). Thus, when more than a preset number (e.g., 20, 30, or more) of fingerprint information samples are used for updating, a false adjustment due to low accuracy of the target configuration parameter may be avoided. In addition, when updating is performed under the condition that the difference between the target configuration parameter and the current configuration parameter exceeds a preset range, too frequent adjustment can be avoided.

As can be known from the above description of the process, the current configuration parameter of the electronic device may be factory settings of the product, such as an anti-spoofing detection configuration parameter designed in a development stage; it may also be anti-spoofing detection configuration parameters updated once or more times according to the updating method provided in the embodiments of the present disclosure. In other words, the updating method provided in the embodiments of the present disclosure may be performed all the time during operation of the electronic device, so as to perform iterative updating, and continuously approach the desired or target configuration of the electronic device.

The configuration parameter updating method of the electronic device according to the embodiment of the present disclosure is described above with reference to the drawings. As can be known from the above description, the previous configuration parameter can be modified by valid fingerprint information collected during operation of the individual electronic device. Since the configuration of the individual electronic device can be modified in a later stage, the tolerance to hardware differences is increased, and thus the workload and the cost required in the earlier development stage can be reduced, thereby improving the overall efficiency. Furthermore, such updating solutions can also increase customization flexibility of the electronic device.

The configuration parameter for anti-spoofing detection may be expressed in various forms. Generally, the configuration parameter for anti-spoofing detection may be determined based on anti-spoofing detection distribution. The anti-spoofing detection distribution is a statistical distribution of detect scores obtained from anti-spoofing detection of a plurality of fingerprint information samples.

Figure 2:
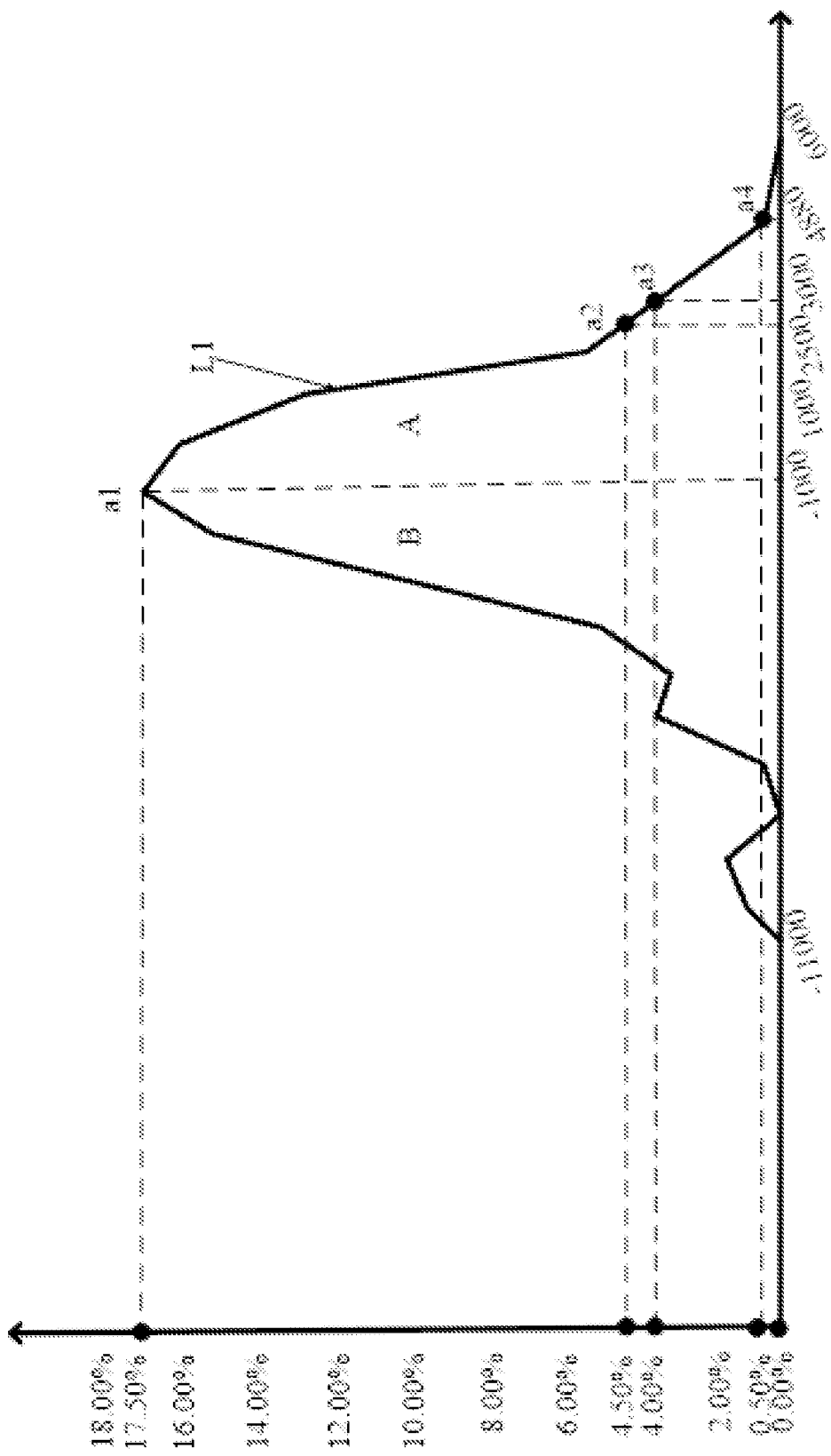
FIG. 2 is a schematic diagram of anti-spoofing detection distribution of an electronic device according to an embodiment of the disclosure.

FIG. 2 exemplarily shows an anti-spoofing detection distribution curve L1 of an electronic device, where the abscissas represent detect scores of the fingerprint information samples, and the ordinates represent proportions of the number of fingerprint information samples of the respective detect scores in the total number of fingerprint information samples. It will be appreciated that the anti-spoofing detection distribution curve may be regarded as a probability distribution density curve of detect scores. For ease of description, only partial detect scores and proportions are shown in the figure. In an embodiment of the present disclosure, the anti-spoofing detection distribution curve is established based on the fingerprint information samples collected in the trusted mode, and thus the anti-spoofing detection distribution curve of FIG. 2 is a real hand distribution curve based on fingerprint information samples of a real hand. In the example of FIG. 2, when the detect score of a fingerprint information sample falls within a certain threshold range, it is determined to be real finger; otherwise, it is determined to be a fake finger. For example, it is determined to be a real finger when the score is below a threshold, and determined to be a fake finger when the score exceeds the threshold. It will be appreciated that the corresponding anti-spoofing detection distribution curve may be established based on the fingerprint information samples of a fake hand, i.e., a fake hand distribution curve. Likewise, based on a set threshold range, it is determined to be a fake finger when the score falls into the threshold range; otherwise, it is determined to be a real finger. For example, it is determined to be a fake finger when the score is below a threshold, and determined to be a real finger when the score exceeds the threshold.

As can be seen from the figure, the anti-spoofing detection distribution curve L1 is basically in normal distribution, the minimum value of the detect score is about −11000, the maximum value is about 6000, and the proportion of the scores lower than the minimum value or higher than the maximum value is extremely low, approaching to 0. The peak of the curve L1 corresponds to a detect score of −1000, and a proportion of 17.5%, i.e., about 17.5% of all samples has a detect score of −1000. It can be seen that most detect scores of the real fingers are concentrated in a certain range around the mean, below, for example, −10000, is very similar to a real hand and above, for example, 5000, is very similar to a fake hand. In order to minimize misjudgment of the real hand, a proper threshold may be selected and set on the right side of the distribution curve.

The configuration parameter for anti-spoofing detection may be various parameters for describing or representing the anti-spoofing detection distribution curve, including but not limited to any one or more of: a median, a standard deviation and an average of the anti-spoofing detection distribution, a detect score threshold exceeding a preset proportion or a detect score reaching a preset proportion. The configuration parameter may also include, for example, an ideal threshold for fingerprint anti-spoofing detection regarding the electronic device. In an embodiment, the ideal threshold may be set to, for example, a detect score where a distribution probability exceeds a designated value (e.g., 99.5%). In the shown example, the ideal threshold is, for example, the detect score 4880 corresponding to the point a4. It is determined to be a real finger when the detect score is below 4880, and it is determined to be a non-real finger when the detect score is above 4880.

Thus, in some embodiments of the present disclosure, the step S103 in FIG. 1 of acquiring the target configuration parameter of the electronic device may further include: calculating a detect score based on each fingerprint information sample in the collected credible fingerprint information; generating or updating anti-spoofing detection distribution of the electronic device according to a plurality of detect scores; and determining the target configuration parameter based on the anti-spoofing detection distribution.

The detect score may be calculated in a variety of ways. Common methods for calculating the detect score include, but are not limited to: the number of feature points, positional relations of feature points, a grain trend, analysis of grayscale changes, and the like. As is known to those skilled in the art, a real hand fingerprint has more characteristics compared with a fake hand fingerprint. The characteristics may include, for example, a fixed number (typically 50 or 60) of feature points contained in the real hand fingerprint, while a fake hand fingerprint is distorted to some extent and thus leads to lost feature points. The characteristics may further include different positional relations among different feature points of the real hand fingerprint. For example, some feature points may form a triangular shape, while other feature points may form a rectangular shape. The characteristics may further include a trend or discontinuity of the fingerprint pattern. For example, the pattern may include a break, a bifurcation, a kink, or the like. In addition to the above, the characteristics may further include different extension heights of ridges in different fingerprints. Therefore, some embodiments of the present disclosure may use these characteristics to make similarity comparison between the fingerprint information sample and the reference fingerprint information, and obtain the detect score according to the comparison result.

In some embodiments, the detect score of each fingerprint information sample may be obtained by calculating based on the collected fingerprint information sample using an anti-spoofing detector learning model. The anti-spoofing detector learning model may be various known pre-trained machine models which can be trained with a large number of true and false fingerprint training samples, so that the corresponding detect score can be given for the input fingerprint information sample in execution of an inferencing task.

Although different calculation methods of the detect score are described above in conjunction with the embodiments, it will be appreciated that the embodiments of the present disclosure may employ various existing and future developed detect score calculation methods to calculate the detect score of the fingerprint information sample, and the present disclosure is not limited in this respect.

After the detect scores of a plurality of fingerprint information samples are obtained through the above method, the anti-spoofing detection distribution of the electronic device may be generated and updated. Specifically, a proportion of the number of fingerprint information samples of each detect score may be counted in the total number of fingerprint information samples, so that the anti-spoofing detection distribution of the electronic device may be generated and updated based on the detect scores and corresponding proportions. It will be appreciated that the more fingerprint information is collected, the more accurate the resulting anti-spoofing detection distribution will be, and thus the more accurate the target configuration parameter obtained therefrom will be. Thereby, it will be appreciated that the electronic device can continuously update the last anti-spoofing detection distribution through continuously increased fingerprint information, and further, can ensure that the integrity and the accuracy of the anti-spoofing detection distribution are continuously improved.

Next, the target configuration parameter may be determined based on the latest anti-spoofing detection distribution. As mentioned above, the target configuration parameter may include, but is not limited to, a median, a standard deviation and an average of the anti-spoofing detection distribution, a detect score threshold exceeding a preset proportion or a detect score reaching a preset proportion. Assuming that FIG. 2 is the latest anti-spoofing detection distribution currently generated by the electronic device, the target configuration parameter thereof may include, but is not limited to: a peak detect score −1000, an average detect score of the anti-spoofing detection distribution, also approximately the peak −1000, a detect score threshold 4000 where a distribution probability exceeds a designated value (e.g., 99.5%), etc.

After generating the target configuration parameter, the electronic device may store it for later use. As mentioned above, when it is determined that the target configuration parameter and/or the current configuration parameter of the electronic device satisfies the preset condition, the current configuration parameter of the electronic device may be updated based on the target configuration parameter of the electronic device.

In an embodiment, the preset condition may be a limitation to the number of fingerprint information samples or a difference between the target configuration parameter and the current configuration parameter. For example, when the number of fingerprint information samples used for generating the target configuration parameters exceeds a preset number (e.g., 30), the generated anti-spoofing detection distribution is more accurate and complete, and more accurate target configuration parameter is obtained therefrom. At this time, the target configuration parameter generated this time may be used for updating the previous configuration parameter, thereby obtaining ever more accurate fingerprint recognition.

With the increased number of collected fingerprint information samples, the generated configuration parameter becomes more and more accurate, but in some scenarios where changes in the configuration parameter is relatively small, the improvement of the corresponding fingerprint recognition accuracy is accordingly small. Updating in such a case will waste resources of the device, and thus reduce the operation efficiency of the device. On this basis, the updating may be set to be performed only when one or more differences between the target configuration parameter and the current configuration parameter exceed a preset value, so that the updated configuration parameter can be ensured to contribute greatly to the improvement of the fingerprint recognition accuracy.

It will be appreciated that in order to further improve the fingerprint recognition accuracy each time the configuration parameter is updated, the first update condition (limitation to the number of fingerprint information samples) and the second update condition (difference between the target configuration parameter and the current configuration parameter) may be combined to jointly define the update operation of the configuration parameter, so that the fingerprint recognition effect and the operation efficiency of the device are both considered in each updating.

The exemplary principle of updating a current configuration parameter of an electronic device based on the target configuration parameter according to an embodiment of the disclosure is explained below with reference to FIG. 3.

Figure 3:
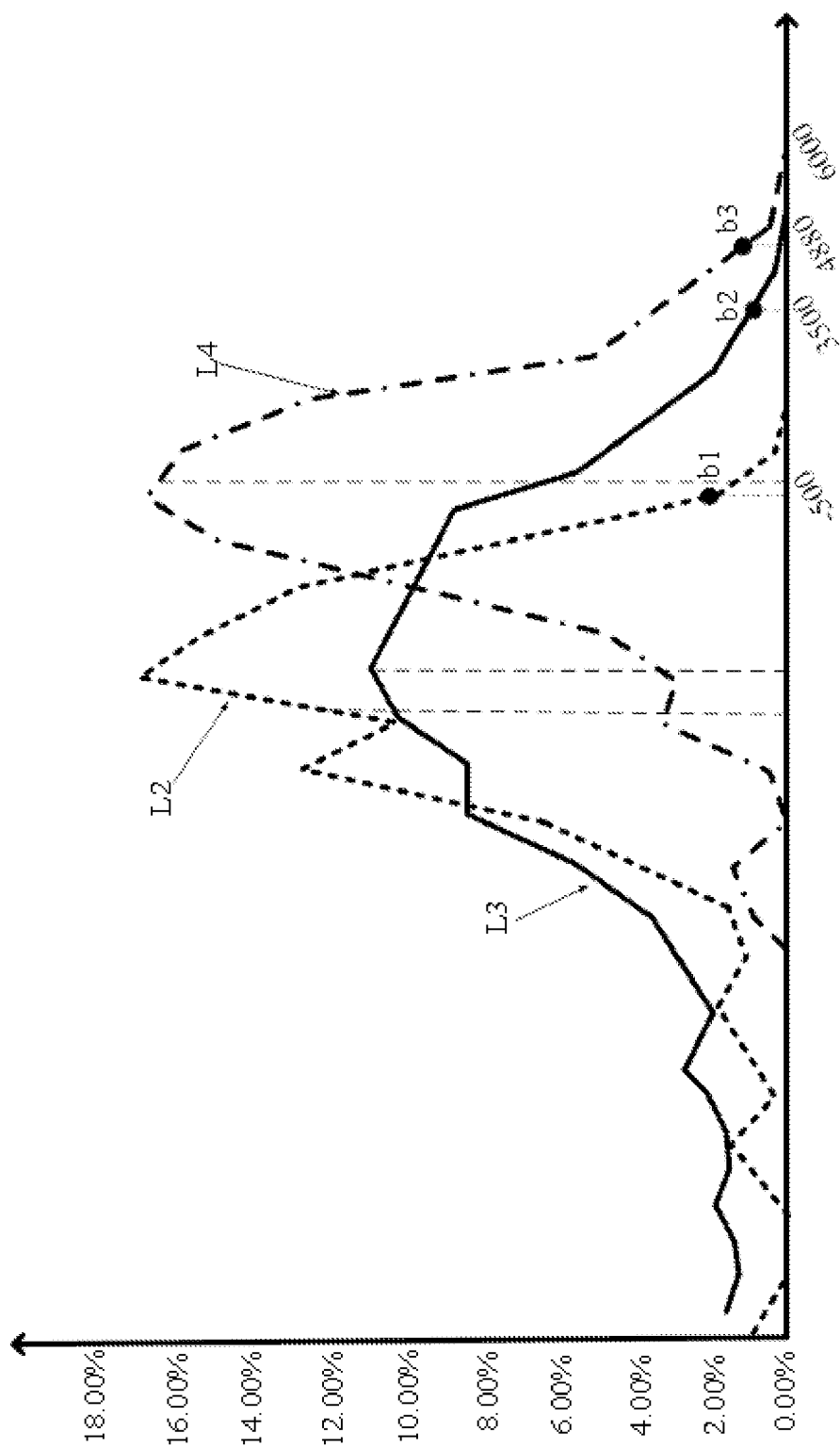
FIG. 3 is an exemplary principle of updating a current configuration parameter of an electronic device based on the target configuration parameter according to an embodiment of the disclosure.

Three anti-spoofing detection distribution curves L2, L3 and L4 are shown in FIG. 3, wherein curve L2 is an anti-spoofing detection distribution curve obtained by testing with a specific electronic device A in the device development stage; curve L3 is an average anti-spoofing detection distribution curve of all devices obtained from statistical analysis of all the test devices in the device development stage; and curve L4 is an anti-spoofing detection distribution curve of a delivered electronic device B in a user operation phase generated by the method according to the embodiment of the present disclosure.

By comparing the three anti-spoofing detection distribution curves, it can be seen that the anti-spoofing detection distribution curve of a single device (such as device A or device B) and the average anti-spoofing detection distribution curve of all devices are both in normal distribution, but the curve of the single device is higher in shape, i.e., has a larger standard deviation, while the average anti-spoofing detection distribution curve has a smaller standard deviation. The distribution curves of the different individual devices are similar in shape, with close standard deviations but highly deviated averages, as indicated by the vertical dashed lines in the figure.

Also shown is an average threshold for anti-spoofing detection, i.e., the detect score 3500 corresponding to a point b2 on the curve L3, given based on the average anti-spoofing detection distribution curve L3 of all devices. Similarly, based on the anti-spoofing detection distribution curve L2 of the single device A in the development stage, it can also be determined that the ideal threshold for anti-spoofing detection of the device A will be somewhere to the right of the curve. The specific position may be estimated, for example, from the relativity between the curve L2 and the curve L3. For example, based on the difference between the respective averages of the two curves, the difference between the standard deviations, and so on, it may be determined that the ideal threshold for the device A is located at the point b1 on L2, which corresponds to a detect score of −500. If the device A is to perform anti-spoofing detection using a threshold determined based on the average anti-spoofing detection distribution curve L3 of the overall device, such as the detect score 3500, it will be an overly stringent standard for the device A, where a large portion of real fingerprints may be recognized as fake fingerprints. Therefore, according to the updating or modifying solutions provided in the embodiments of the present disclosure, if the threshold for anti-spoofing detection of the device A is adjusted to −500 after the anti-spoofing detection distribution curve L2 of the device A is confirmed, it will fit the device A better.

From the above analysis, it can be seen that, when the average anti-spoofing detection distribution curve of all devices and the anti-spoofing detection distribution curve of an individual device are known, the anti-spoofing detection configuration parameter suitable for the individual device can be adjusted and obtained based on the relativity between the two. The above principle is also applicable to updating the anti-spoofing detection configuration parameter of the delivered electronic device B.

It will be appreciated that the initial anti-spoofing detection configuration parameter of the electronic device B may be determined based on the curve L3 of all devices. For example, the detect score threshold for the anti-spoofing detection is the detect score 3500 corresponding to the point b2 on the curve L3. During operation of the electronic device B by a user, the anti-spoofing detection distribution curve of the electronic device B, which will be continuously generated or updated according to the method provided in the embodiments of the present disclosure, may, for example, be characterized by the target configuration parameter. Based on the above principle, the current anti-spoofing detection configuration parameter may be modified according to the relativity between the currently acquired anti-spoofing detection distribution curve and the average anti-spoofing detection distribution curve configured for all devices in factory, for example, modified to the detect score 4880 corresponding to the point B3 on the anti-spoofing detection distribution curve L4 of the device B.

In some embodiments, the current configuration parameter of the electronic device B may be modified based on the target configuration parameter thereof according to a preset rule. In an implementation, the above modification may include adjusting a distribution average in the current configuration parameter according to a distribution average in the target configuration parameter, and predicting anti-spoofing detection distribution of the electronic device using a standard deviation in the current configuration parameter, thereby selecting a value of which the probability distribution exceeds a designated value as an ideal threshold, and adjusting the anti-spoofing detection threshold in the current configuration parameter based on the ideal threshold. The above adjustment may include directly replacing the current configuration parameter with the target configuration parameter, or adjusting to a weighted average of the target configuration parameter and the current configuration parameter; the embodiments of the present disclosure are not limited in this respect. It will be appreciated that there may be various ways of modification. For example, the ideal threshold may be determined according to a setting rule of the anti-spoofing detection threshold based on the latest anti-spoofing detection distribution curve of the electronic device B, and then the anti-spoofing detection threshold in the current configuration parameter is adjusted based on the ideal threshold.

Through the foregoing description about the method for generating and updating configuration parameters, those skilled in the art will appreciate that the solutions of the present disclosure can ensure accuracy of the generated target configuration parameter by defining the fingerprint information collection mode (trusted mode), and enable great improvement of the fingerprint recognition accuracy each time the configuration parameter is updated by defining one or more update conditions (for example, the first and second update conditions as described above), thereby realizing high precision of fingerprint recognition.

An information processing method when the electronic device collects fingerprint information in a trusted mode has been described above, and in actual use, the electronic device may have various modes, some of which are untrusted and not secure enough, for example, unlock operations number of the electronic device in a preset time period (e.g., 1 minute) exceeds a preset number (e.g., 5), or a difference between a fingerprint recognition score in a latest time period (e.g., 3 minutes) and a historical score exceeding a preset range (for example, each of a plurality of detect scores calculated within 3 minutes is lower than a historical detect score and the difference exceeds 500). The fingerprints collected in these cases are very likely to be fingerprints of a fake hand, and if such fingerprint information of a lower confidence is used for generating the configuration parameter, the accuracy will be reduced and thus the fingerprint recognition accuracy will be affected. Therefore, the fingerprint information collected in these cases is not regarded as valid samples, i.e., the target configuration parameter of the electronic device is not updated, and the fingerprint recognition still adopt the current configuration parameter which is more credible so that the accuracy of fingerprint recognition is ensured.

Figure 4:
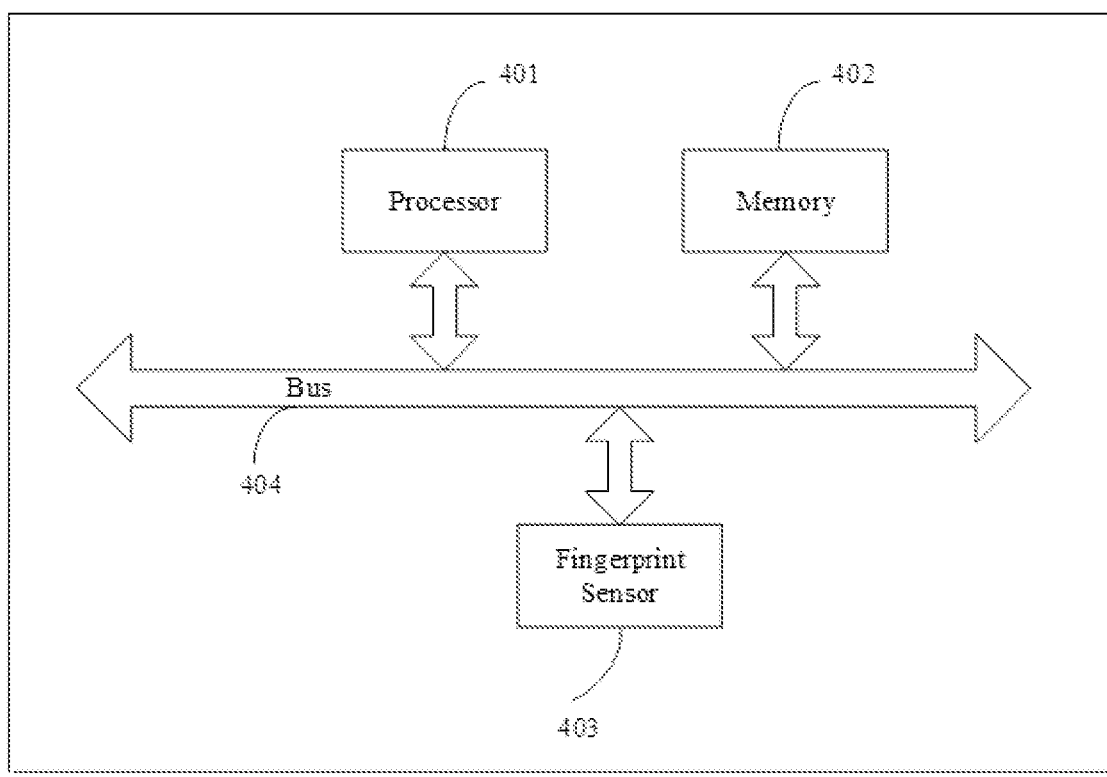
FIG. 4 is an exemplary block diagram of an electronic device according to an embodiment of the disclosure.

FIG. 4 is a schematic block diagram of an electronic device according to an embodiment of the disclosure. As shown in FIG. 4, the electronic device 400 of the present disclosure may include a processor 401, a memory 402, and a fingerprint sensor 403, wherein the processor 401, the memory 402, and the fingerprint sensor 403 may communicate with each other via a bus 404. The memory 402 stores program instructions executable by the processor 401, and the program instructions, when executed by the processor 401, may cause the electronic device to perform the method steps as described above in conjunction with the figures. With the electronic device of the present disclosure, accuracy of the generated target configuration parameter is ensured, and the fingerprint recognition accuracy can be greatly improved each time the configuration parameter is updated, thereby realizing high precision of fingerprint recognition.

Those of ordinary skill in the art will understand that: all or part of the steps of implementing the above method embodiments may be performed by hardware associated with the program instructions, and the program may be stored in a non-transitory computer-readable storage medium, and when executed, causes the steps including the above method embodiments to be implemented.

Through the description of the above implementations, those skilled in the art can clearly understand that the implementations may be implemented by means of software plus a necessary general hardware platform. Obviously, it may also be implemented by hardware. Based on such understanding, the technical solutions of the present invention essentially or, in other words, a part thereof contributing to the prior art, can be embodied in the form of a software product, wherein the computer software product may be stored in a computer-readable storage medium (such as an ROM/RAM, a disk, or an optical disc) and includes a number of instructions to make a computer device (which may be a PC, a server, or a network device, etc.) to execute the methods described in the various embodiments, or in a certain portion thereof, of the present disclosure.

It should be understood that the terms "first," "second," "third," and "fourth," etc. in the claims, description, and drawings of the present disclosure are used to distinguish between different objects, and are not used to describe a particular order. The terms "includes" and "including," when used in the description and claims of the present disclosure, specify the presence of stated features, integers, steps, operations, elements, and/or components, but do not preclude the presence or addition of one or more other features, integers, steps, operations, elements, components, and/or groups thereof.

It is also to be understood that the terminology used in the description of the disclosure herein is for the purpose of describing particular embodiments only, and is not intended to be limiting of the disclosure. As used in the specification and claims of the disclosure, the singular forms "a", "an" and "the" are intended to include the plural forms as well, unless the context clearly indicates otherwise. It should be further understood that the term "and/or" as used in the description and claims of the disclosure refers to any and all possible combinations of one or more of the associated listed items and includes such combinations.

The above embodiments are only used to illustrate the technical solutions of the embodiments of the present disclosure, but not to limit the same; although embodiments of the present disclosure have been described in detail with reference to the foregoing embodiments, those of ordinary skill in the art will understand that: the technical solutions described in the foregoing embodiments may still be modified, or some or all of the technical features therein may be equivalently replaced; such modifications or substitutions do not depart from the scope of the embodiments of the present disclosure by the essence of the corresponding technical solutions.

What is claimed is:

1. An updating method for configuration parameters of an electronic device, comprising:
   acquiring fingerprint information collected by a fingerprint sensor at the electronic device;
   determining whether the fingerprint information is collected in a trusted mode;
   acquiring, in response to determining that the fingerprint information is collected in the trusted mode, a target configuration parameter of the electronic device for anti-spoofing detection according to the fingerprint information; and
   updating, in response to that the target configuration parameter of the electronic device and/or a current configuration parameter of the electronic device satisfies a preset condition, the current configuration parameter of the electronic device based on the target configuration parameter of the electronic device, wherein the current configuration parameter is used by the electronic device for anti-spoofing detection of a fingerprint in fingerprint information to be recognized,
   wherein the acquiring of the target configuration parameter of the electronic device comprises:
   calculating a detect score based on each fingerprint information sample in the fingerprint information;
   generating or updating anti-spoofing detection distribution of the electronic device according to a plurality of detect scores; and
   determining the target configuration parameter based on the anti-spoofing detection distribution.

2. The updating method according to claim 1, wherein determining whether the fingerprint information is collected in the trusted mode comprises:
   determining that the fingerprint information is collected in the trusted mode in response to detection of any one of:
   the electronic device is in a preset mode of operation;
   the electronic device is within a preset time period after executing a preset operation; or
   the electronic device executes fingerprint recognition based on the fingerprint information, and the recognition result is a preset result.

3. The updating method according to claim 2, wherein:
   the preset mode of operation comprises a registration mode;
   the preset operation comprises a successful non-fingerprint unlock operation or an initial start-up operation; and/or
   the preset result comprises that a preset number of continuous fingerprint recognition scores exceed a preset threshold.

4. The updating method according to claim 1, wherein calculating the detect score comprises:
   calculating based on the fingerprint information sample using an anti-spoofing detector learning model to obtain the detect score of each fingerprint information sample.

5. The updating method according to claim 1, wherein generating or updating anti-spoofing detection distribution of the electronic device comprises:
   counting a proportion of the number of fingerprint information samples of each detect score in the total number of fingerprint information samples; and
   generating or updating the anti-spoofing detection distribution based on the detect score and the corresponding proportion.

6. The updating method according to claim 1, wherein the target configuration parameter comprises any one or more of: a median, a standard deviation and an average of the anti-spoofing detection distribution, a detect score threshold exceeding a preset proportion or a detect score reaching a preset proportion.

7. The updating method according to claim 1, wherein the preset condition comprises any one or more of:
 the number of fingerprint information samples on which the target configuration parameter is based exceed a preset number; or
 a difference between the target configuration parameter and the current configuration parameter exceeds a preset range.

8. The updating method according to claim 1, wherein updating the current configuration parameter of the electronic device based on the target configuration parameter of the electronic device comprises:
 modifying the current configuration parameter based on the target configuration parameter according to a preset rule.

9. The updating method according to claim 1, further comprising:
 performing, in response to determining that the fingerprint information is not collected in a trusted mode, anti-spoofing detection of the fingerprint information based on the current configuration parameter of the electronic device.

10. The updating method according to claim 1, wherein determining whether the fingerprint information is collected in the trusted mode comprises: determining that the fingerprint information is not collected in the trusted mode in response to detection of any one of:
 unlock operations number of the electronic device in a preset time period exceeds a preset number; or
 a difference between a fingerprint recognition score in a latest time period and a historical score of the electronic device exceeds a preset range.

11. An electronic device, comprising:
 a processor; and
 a memory storing program instructions executable by the processor, wherein the program instructions, when executed by the processor, cause the electronic device to perform the operations of:
 acquiring fingerprint information collected by a fingerprint sensor at the electronic device;
 determining whether the fingerprint information is collected in a trusted mode;
 acquiring, in response to determining that the fingerprint information is collected in the trusted mode, a target configuration parameter of the electronic device for anti-spoofing detection according to the fingerprint information; and
 updating, in response to that the target configuration parameter of the electronic device and/or a current configuration parameter of the electronic device satisfies a preset condition, the current configuration parameter of the electronic device based on the target configuration parameter of the electronic device, wherein the current configuration parameter is used by the electronic device for anti-spoofing detection of a fingerprint in fingerprint information to be recognized,
 wherein the acquiring of the target configuration parameter of the electronic device comprises:
 calculating a detect score based on each fingerprint information sample in the fingerprint information;
 generating or updating anti-spoofing detection distribution of the electronic device according to a plurality of detect scores; and
 determining the target configuration parameter based on the anti-spoofing detection distribution.

12. The electronic device according to claim 11, wherein the program instructions, when executed by the processor, cause the electronic device to perform the operations of:
 determining that the fingerprint information is collected in the trusted mode in response to detection of any one of:
 the electronic device is in a preset mode of operation;
 the electronic device is within a preset time period after executing a preset operation; or
 the electronic device executes fingerprint recognition based on the fingerprint information, and the recognition result is a preset result.

13. The electronic device according to claim 12, wherein the preset mode of operation comprises a registration mode;
 the preset operation comprises a successful non-fingerprint unlock operation or an initial start-up operation; and/or
 the preset result comprises that a preset number of continuous fingerprint recognition scores exceed a preset threshold.

14. The electronic device according to claim 11, wherein the program instructions, when executed by the processor, cause the electronic device to perform the operations of:
 calculating based on the fingerprint information sample using an anti-spoofing detector learning model to obtain the detect score of each fingerprint information sample.

15. The electronic device according to claim 11, wherein the program instructions, when executed by the processor, cause the electronic device to perform the operations of:
 counting a proportion of the number of fingerprint information samples of each detect score in the total number of fingerprint information samples; and
 generating or updating the anti-spoofing detection distribution based on the detect score and the corresponding proportion.

16. The electronic device according to claim 11, wherein the target configuration parameter comprises any one or more of: a median, a standard deviation and an average of the anti-spoofing detection distribution, a detect score threshold exceeding a preset proportion or a detect score reaching a preset proportion.

17. The electronic device according to claim 11, wherein the preset condition comprises any one or more of:
 the number of fingerprint information samples on which the target configuration parameter is based exceed a preset number; or
 a difference between the target configuration parameter and the current configuration parameter exceeds a preset range.

18. The electronic device according to claim 11, wherein the program instructions, when executed by the processor, cause the electronic device to perform the operations of:
 modifying the current configuration parameter based on the target configuration parameter according to a preset rule.

19. The electronic device according to claim 11, wherein the program instructions, when executed by the processor, cause the electronic device to perform the operations of:
 performing, in response to determining that the fingerprint information is not collected in a trusted mode, anti-spoofing detection of the fingerprint information based on the current configuration parameter of the electronic device.

20. The electronic device according to claim 11, wherein the program instructions, when executed by the processor, cause the electronic device to perform the operations of:

determining that the fingerprint information is not collected in the trusted mode in response to detection of any one of:

unlock operations number of the electronic device in a preset time period exceeds a preset number; or a difference between a fingerprint recognition score in a latest time period and a historical score of the electronic device exceeds a preset range.

21. A non-transitory computer-readable storage medium storing program instructions for updating configuration parameters of an electronic device, wherein the program instructions, when executed by at least one processor, causing the following operations to be implemented:

acquiring fingerprint information collected by a fingerprint sensor at the electronic device;

determining whether the fingerprint information is collected in a trusted mode;

acquiring, in response to determining that the fingerprint information is collected in the trusted mode, a target configuration parameter of the electronic device for anti-spoofing detection according to the fingerprint information; and updating, in response to that the target configuration parameter of the electronic device and/or a current configuration parameter of the electronic device satisfies a preset condition, the current configuration parameter of the electronic device based on the target configuration parameter of the electronic device, wherein the current configuration parameter is used by the electronic device for anti-spoofing detection of a fingerprint in fingerprint information to be recognized, wherein the acquiring pf the target configuration parameter of the electronic device comprises:

calculating a detect score based on each fingerprint information sample in the fingerprint information;

generating or updating anti-spoofing detection distribution of the electronic device according to a plurality of detect scores; and determining the target configuration parameter based on the anti-spoofing detection distribution.

\* \* \* \* \*